Oct. 4, 1960 G. DOROTHEA 2,954,951

SLIDE LOCK MOUNTING MEANS

Filed Jan. 26, 1959

INVENTOR.

GALE DOROTHEA

BY 2,954,951

SLIDE LOCK MOUNTING MEANS

Gale Dorothea, Flushing, N.Y., assignor to Viewlex, Inc., Long Island City, N.Y.

Filed Jan. 26, 1959, Ser. No. 788,978

8 Claims. (Cl. 248—14)

This invention relates to means for securely mounting components on a panel without any nuts, bolts, brackets, or lock washers.

The mounting of components or sub-assemblies, for instance, motors, meters, switches, volume controls, clocks, loud speakers, microphones, lights and many other components, generally involves the use of mounting screws, nuts and bolts or more elaborate brackets. To minimize the effect of vibration, lock washers are also generally required.

In the repair and maintenance of electrical and electronic apparatus, a great percentage of the repair time is spent mounting or removing various components. Many of these are in inaccessible places where it is difficult to insert screws and bolts. Many of these screws and nuts are of special types and sizes which require a variety of special tools which are not always available.

Therefore, there is a need for a simple vibration-proof mounting for electrical and other components which does not require the use of nuts, bolts, screws or lock washers or the use of any tools.

The present invention eliminates the use of all nuts, bolts, brackets and lock washers. The present invention comprises a mounting panel having an internal tongue which is formed by slotting the plate on three sides of a rectangle. The center of the tongue is slotted and there are a pair of diagonal slots at an angle to the tongue and a pair of raised portions on the panel adjacent the diagonal slots. The purpose of the center slot on the tongue is to receive a center projection on the component to be mounted, for instance, a motor shaft and bearing on a small motor, and the raised portions adjacent the diagonal slots are for accommodating conventional mounting ears on the component. These ears may be the standard ones provided for screw type mountings.

To mount the component in the panel of the present invention, the center projection or shaft of the component is inserted in the center slot of the tongue and the mounting ears are inserted behind the raised portions adjacent the diagonal slots. The component is then slipped down into position. The center slot in the tongue preferably has an enlarged portion adapted to fit the center projection of the component. As the component is slipped down, the tongue is sprung back until the center projection of the component snaps into the enlarged portion of the tongue slot. The tongue then snaps forward and holds the component with spring pressure.

Accordingly, a principal object of the invention is to provide new and improved mounting means.

Another object of the invention is to provide new and improved mounting means for removable components without the use of nuts, bolts, brackets or lock washers.

Another object of the invention is to provide new and improved anti-vibration mounting means.

Another object of the invention is to provide new and improved anti-vibration mounting means without the use of nuts, bolts, brackets or lock washers.

Another object of the invention is to provide new and improved mounting means for mounting electrical or other components without the use of any tools.

Another object of the invention is to provide new and improved mounting means for electrical or other components of the type having conventional mounting ears.

Another object of the invention is to provide new and improved mounting means comprising a plate member having an internal tongue spring having a central slot and a pair of diagonal slots on either side of the tongue spring.

These and other objects of the invention will be apparent from the following specification and drawings, of which:

Figure 3:
Figure 3 is a sectional view along the line 3—3 of Figure 1.
Figure 2:
Figure 2 is a side view of the embodiment of Figure 1.
Figure 1:
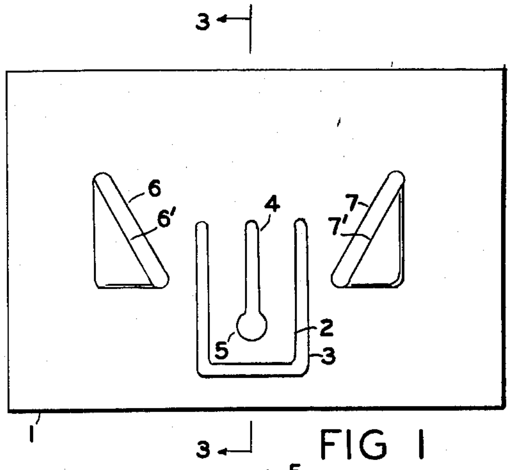
Figure 1 is a front view of an embodiment of the invention.

Referring to the figures, the invention comprises a panel or plate member 1 which has an internal tongue 2 which is formed by providing a slot 3 around three sides of a rectangle. The tongue 2 has a center slot 4 which preferably has an enlarged portion 5 near the end of the tongue. A pair of diagonal slots 6 and 7 are provided in the panel on either side of the tongue and they are angled so that the distance between them decreases in the direction from the base of the tongue to the tip of the tongue. A pair of raised portions 6' and 7' of the plate are provided adjacent the slots 6 and 7. The purpose of the raised portions is to accommodate the mounting ears 11 and 12 on the side of the components to be mounted and the purpose of the center slot 4 in the tongue is to accommodate a center projection on the component to be mounted. The plate 1 is preferably made of a good grade of steel so that the tongue has spring properties.

The mounting plate is designed for a component of the type having a pair of side ears and a center projection to provide three-point holding. For instance, in a small motor the center projection could be the motor bearing and shaft. In other components the center projection could be added on by attaching a stud or molded into the casing.

Figure 5:
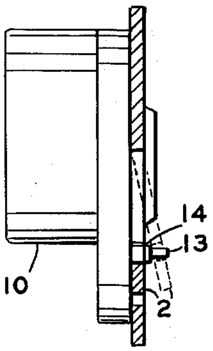
Figure 5 is a view partly in section taken along the line 5—5 of Figure 4.
Figure 4:
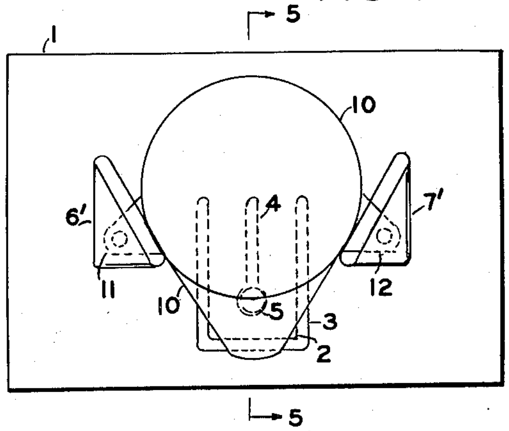
Figure 4 is a front view, similar to Figure 1, illustrating the use of the invention.
Figure 6:
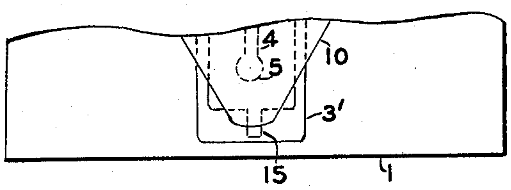

Referring to Figures 4, 5, and 6 there is illustrated the use of the plate for mounting a small motor 10 having a pair of mounting ears 11 and 12, a shaft 13 and an extension shaft bearing 14. The motor is mounted by inserting the shaft in the center slot of the tongue at its upper end and pressing the motor in against the tongue and inserting the mounting ears in the diagonal slots and then sliding the motor down with the ears behind the raised portions of the plate adjacent the diagonal slots. As the motor is slid down, the tongue is forced back as shown by the dotted lines in Figure 5. However, when the motor is at its lowest position, the enlarged portion 5 of the center slot snaps around the motor bearing securely holding the motor from any upward motion. Therefore, the motor is held at three points, the two mounting ears and the tongue pressing against the motor casing around the center shaft. The tongue holds the motor with a spring action and also with the detent feature, that is, the enlarged slot portion. In order to release the motor it is necessary to spring the tongue back sufficiently to allow the motor bearing to clear the enlarged slot lock 5. Then the motor may be easily slid upwards to remove it.

Figure 7:
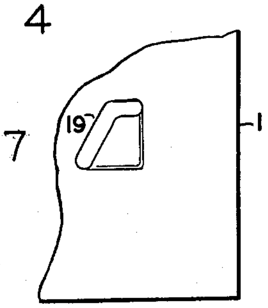
Figures 6 and 7 are detail views of modifications.

In large panels where access to the back of the panel may not be easy, the mounting may be made as shown in Figure 7 so that the tongue has an extension 15 and the main slot 3' is enlarged so that a screw driver or other tool may be inserted against the portion 15 of the tongue in order to spring the back and release the locking action of the slot lock 5. If desired, a portion of the extension 15 may be bent forwardly through the slot 3' so that the tongue may be released by finger pressure to avoid the use of any tools.

The present invention, therefore, provides positive locking means utilizing spring pressure which makes it substantially vibration resistant so that no nuts, bolts or lock washers are required. Also, no tools are required to remove and replace the components. The present invention is not limited to components but may be used wherever it is desired to lock two pieces together. For instance, sub-assemblies, shelves, racks, interlocking panels and covers for equipment may be mounted in the same manner.

Instead of pressing out the portions 6' and 7' adjacent the diagonal slots 6 and 7 the same purpose may be achieved by making enlargements at the upper end of the diagonal slots and using hooked ears on the component instead of ears projecting straight out. If it is desired to increase the spring pressure of the tongue, an additional collar in the shape of a washer may be mounted on the center projection, the washer being slightly larger than the portion 5 of the center slot so that the tongue will be deflected by the thickness of the collar thereby providing a more positive spring pressure at all times.

The slots need not be purely diagonal. The essential thing is that they converge toward the end of the tongue. Therefore, curved or boomerang shaped slot 19 in Figure 7 may be used.

I claim:

1. A slide lock mounting comprising a plate member having an internal tongue formed by slotting said plate on three sides of said tongue, said tongue being centrally slotted, and a pair of angled slots in said plate equally spaced on either side of said tongue, whereby said slots and said slotted tongue form a three-point suspension.

2. Apparatus as in claim 1 wherein the end of said centrally located slot in said tongue is enlarged at the end adjacent the tongue tip.

3. Apparatus as in claim 1 wherein said plate has a raised portion adjacent said angled slots.

4. A slide lock panel mounting comprising, a plate member having an internal tongue spring formed by slotting said plate, a slot in the center of said tongue, a pair of angled slots in said plate equally spaced on either side of said tongue converging toward the tip of said tongue, and raised portions in said plate adjacent the outer sides of said angled slots.

5. Apparatus as in claim 4 wherein the end of said tongue slot adjacent the tongue tip is enlarged whereby as a projecting member of a component is slid down said slot said enlarged slot position will snap around said projecting member.

6. A slide lock mount comprising a plate member having a slotted spring member, a pair of angled slots on said plate member, said slots converging toward said spring member on either side of said spring member.

7. A slide lock mounting comprising a plate member having an internal tongue formed by slotting said plate on three sides of said tongue, said tongue being centrally slotted, and a pair of slots in said plate equally spaced on either side of said tongue, said slots converging toward the tip of said tongue.

8. A slide lock panel mounting comprising, a plate member having an internal tongue spring formed by slotting said plate, a slot in the center of said tongue, a pair of slots in said plate on either side of said tongue converging toward the tip of said tongue, and raised portions in said plate adjacent the outer sides of said slots.

References Cited in the file of this patent

UNITED STATES PATENTS 2,210,235 Filbert ---------------- Aug. 6, 1940

FOREIGN PATENTS 2,447 Great Britain ---------- Sept. 11, 1913